No. 724,694. PATENTED APR. 7, 1903.
R. S. GRAHAM.
WHEEL TIRE.
APPLICATION FILED OCT. 10, 1902.
NO MODEL.

WITNESSES:
Fred White
Thomas Wallace

INVENTOR:
Robert S. Graham,
By Attorneys,
Arthur C. Fraser & Co

THE NORRIS PETERS CO., PHOTO-LITHO., WASHINGTON, D. C.

UNITED STATES PATENT OFFICE.

ROBERT S. GRAHAM, OF NEW YORK, N. Y., ASSIGNOR OF ONE-FOURTH TO WILLIAM M. PERKINS, OF BROOKLYN, NEW YORK.

WHEEL-TIRE.

SPECIFICATION forming part of Letters Patent No. 724,694, dated April 7, 1903.

Application filed October 10, 1902. Serial No. 126,647. (No model.)

*To all whom it may concern:*

Be it known that I, ROBERT S. GRAHAM, a citizen of the United States, residing in the borough of Manhattan, city, county, and State of New York, have invented certain new and useful Improvements in Wheel-Tires, of which the following is a specification.

My invention aims to provide certain improvements in wheel-tires, and especially in means for fastening the same whereby the tire may be readily and tightly attached to the rim and whereby also the life of the tire is prolonged by maintaining the resiliency due to the now common use of rubber for tires.

My invention has certain other advantages referred to in detail hereinafter.

Figure 1:
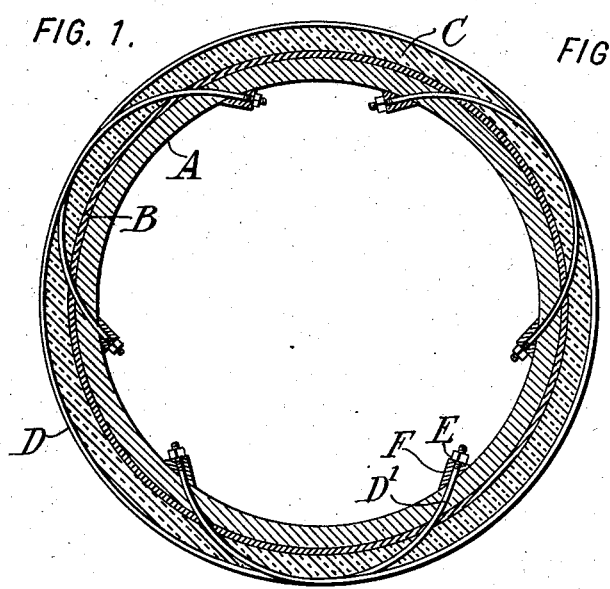
Figure 2:
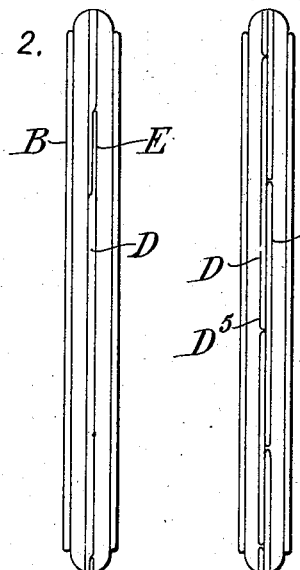
Figure 6:
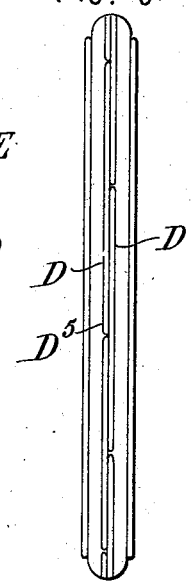
Figure 3:
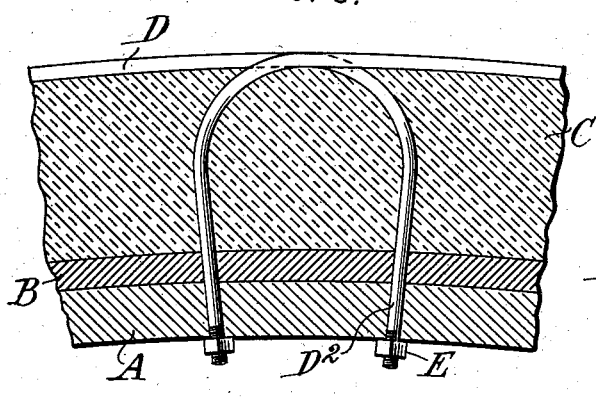
Figure 4:
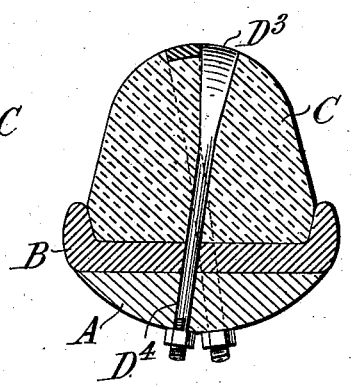
Figure 5:
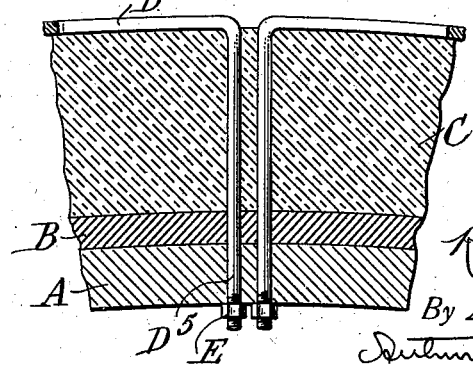

Referring to the drawings illustrating embodiments of the invention, Figure 1 is a section taken longitudinally through the tire and wheel-rim, but showing the retaining-rods in elevation. Fig. 2 is a side elevation of a tire in place on a rim. Fig. 3 is an enlarged view of a portion of the wheel similar to Fig. 1, but showing a different embodiment of the invention. Fig. 4 is a transverse section of Fig. 3. Fig. 5 is a section similar to Fig. 3, showing another embodiment of the invention. Fig. 6 is a view similar to Fig. 2, showing another embodiment of the invention.

Various compositions of rubber and fiber are now generally used for tires for pleasure-vehicles and are held on the rim by means of retaining rods or wires embedded in the rubber, usually near its base. According to my invention I provide an improvement in which the body of the tire is of resilient non-metallic material, such as rubber, and the tread is of metal, which takes all or the greater part of the abrasion to which the tire is ordinarily subjected, thus utilizing the resilient quality of the rubber and the durable quality of the metal.

According to another feature of the invention I provide a retaining rod or wire which runs for the greater portion of its length over the accessible tread of the tire.

A third feature of improvement is in the provision of retaining-rods which are accessible for tightening them at any time after they have been set in place.

Referring now to the embodiments shown in the drawings, A is a wheel-rim, of wood, provided with a trough-shaped metal band B, in which the tire C, of rubber or similar resilient material, is carried. The rim, metal band, and tire are preferably of the common form shown in the drawings, but are not necessarily so, my improvements being applicable to various types of rims and tires. Usually tires of this class are held on the rim by means of retaining-rods embedded in the rubber body C of the tire near its base and extending longitudinally entirely around and joined at its ends in any suitable manner. I propose to dispense with these continuous circular embedded rods and to substitute a series of shorter rods—as, for example, the three rods D, (shown in Figs. 1 and 2,) each passing longitudinally around an equal portion of the tire and overlapping each other at the ends. By arranging these rods at the tread-surface of the tire they give the tire durability, as previously explained; but it is not essential that they should form such a tread portion. They might be embedded in the rubber, preferably near the tread-surface thereof, and still secure the advantages of my invention. The retaining-rods, whether there be but one extending all the way around the wheel or several and whether they form the tread-surface of the tire or not, are arranged conveniently for adjustment by bending the ends downward, as shown, and passing them through the rim, the ends being screw-threaded and provided with nuts E for taking them up, or each rod may have a fixed head at one end and a nut only at the other end. The construction shown permits of tightening the tire at a number of different points of its circumference. In order to keep it uniformly and tightly against the rim, it is only necessary to test the tire at various points by bending it laterally with the hand, and if the movement is too great at any point the rod holding this portion of the tire is tightened. Preferably the rods D overlap each other, as shown in Figs. 1, 2, and 3, so as to prevent a concentration of the tightening effect at the meeting-points of the rods and so as to contribute to the smooth running of the tire on its tread. I prefer to form the rods D with reduced overlapping portions E, as indicated in Fig. 2, so that the tire may be formed with a uniform groove all around. I prefer also that the ends D' of the rods should run at a considerable inclination to the main portion of the rods and the circumference of the tire, so as to avoid too sudden a drawing in of the tire at the point where the retaining-rod turns inward. I may, however, use the construction shown in Fig. 3, in which the ends $D^2$ of the retaining-rods D are bent down sufficiently to be normal to the rim at the point where they pass through the rim, so that the nuts E may bear directly against the rim without the necessity of the angular blocks F. (Shown in Fig. 1.)

Instead of forming the retaining-rods of round section throughout, as indicated in Figs. 1 and 2, they may be made flat, as at $D^3$, Fig. 4, throughout the tread portion, being provided with rounded ends $D^4$ where they pass downward and through the rim. With this construction I also may or may not reduce the overlapping ends of the retaining-rods in the manner shown at E, Fig. 2. Where the retaining-rods are at one side of the central line of the tire, they may be made to hold better if inclined in the manner shown in Fig. 4, so that the ends $D^4$ will be normal to the inner surface of the rim. It is not essential to the invention, however, that the ends of the retaining-rods shall overlap. They may be brought down immediately adjacent to each other, as shown at $D^5$, Fig. 5, or even with an interval of rubber between them which has itself no surrounding retaining-rod.

A convenient and smooth-running construction and one which can be made without the necessity of modifying the section of the retaining-rods at any point may be obtained by the arrangement shown in Fig. 6, in which there are substantially two sets of retaining-rods D running alongside of each other and having their meeting ends, which may be of the form shown at $D^5$, staggered with respect to each other.

Though I have described with great particularity of detail several embodiments of my invention, yet it is to be understood that the invention itself is not limited to the specific embodiments disclosed. Various modifications in the details and arrangement and combination of the parts may be made without departing from the spirit of the invention.

What I claim is—

1. In a vehicle-wheel, the combination of a rim, a resilient non-metallic tire, and means for retaining said tire comprising a rod extending longitudinally of the tire and engaging the latter adjacent to its tread portion, and having its end passed through the rim.

2. In a vehicle-wheel, the combination of a rim, a tire of resilient non-metallic material, and a retaining means for said tire comprising a rod extending longitudinally of the tire, and forming a part of the tread-surface thereof, and having its ends passed through the rim.

3. In a vehicle-wheel, the combination of a rim, a tire of resilient non-metallic material, and a series of retaining-rods for said tire, extending longitudinally thereof, and engaging the latter adjacent to its tread portion, said rods adapted to be separately tightened.

4. In a vehicle-wheel, the combination of a rim, a tire of resilient non-metallic material, and a series of retaining-rods extending longitudinally of the tire, and engaging the latter adjacent to its tread portion, said rods overlapping each other at the ends and passing inward through the rim and adapted to be separately tightened.

5. In a vehicle-wheel, the combination of a rim, a tire of resilient material, and a series of retaining-rods embedded in the outer face of said tire so as to form the tread portion thereof, the adjacent rods overlapping each other and formed with reduced portions at such overlapping-points, and having their ends projecting through the rim and provided with tightening means.

In witness whereof I have hereunto signed my name in the presence of two subscribing witnesses.

ROBERT S. GRAHAM.

Witnesses:
FRED WHITE,
DOMINGO A. USINA.